United States Patent [19]

De Marco

[11] Patent Number: 5,587,005
[45] Date of Patent: Dec. 24, 1996

[54] AIR PURIFIER APPARATUS WITH AN ELECTROSTATIC FILTER

[75] Inventor: Doreano De Marco, Belluno, Italy

[73] Assignee: Procond Elettronica S.p.A., Belluno, Italy

[21] Appl. No.: 399,553

[22] Filed: Mar. 7, 1995

[30] Foreign Application Priority Data

Mar. 16, 1994 [IT] Italy .................... PN94A0015

[51] Int. Cl.$^6$ ...................................... B03C 3/72
[52] U.S. Cl. .............. 96/26; 55/274; 95/2; 95/25; 96/80
[58] Field of Search ................... 96/26, 66, 68, 96/80, 98; 95/25, 78, 2; 55/274, 422, 493

[56] References Cited

U.S. PATENT DOCUMENTS

3,504,482  4/1970  Goettl ...................... 55/493 X
5,232,478  8/1993  Farris ........................... 96/26

FOREIGN PATENT DOCUMENTS

6-91199   4/1994  Japan ........................... 96/26
2127556   4/1984  United Kingdom .

Primary Examiner—Richard L. Chiesa
Attorney, Agent, or Firm—Wenderoth, Lind & Ponack

[57] ABSTRACT

In an air purifier apparatus, an electrostatic filter is detachably and operatively connectable to an electrical contact which in turn is connected to a terminal of a power supply. The electrostatic filter is also detachably and operatively connectable to a second electrical contact which is connected to an alarm device. When the electrostatic filter is properly mounted within the air purifier apparatus, the two electrical contacts are short-circuited, thus electrically connecting the power supply to the alarm device through the electrostatic filter. The alarm device provides an indication that the electrostatic filter is properly mounted within the air purifier apparatus when energized by the power supply.

4 Claims, 2 Drawing Sheets

AIR PURIFIER APPARATUS WITH AN ELECTROSTATIC FILTER

BACKGROUND OF THE INVENTION

1. Field of the Invention

This invention relates to an improvement in an air purifier apparatus of the type which includes an electrostatic filter.

2. Description of the Related Art

Such air purifiers are largely known to substantially include a conduit in which a flow of air, circulating therethrough either naturally or with the assistance of a fan, is conveyed so as to pass in succession a first electrode and an electrically conductive filter acting as a second electrode. A high DC voltage is applied between the electrodes so that dirt particles suspended in the air stream are ionized by the first electrode and, due to an electrostatic effect, are then attracted by the filter, on which they settle due to a mechanical effect.

Air purifiers of this type are particularly effective with regard to their performance capabilities, but require frequent cleaning or replacement of the filter. The filter is therefore installed in a removable manner inside the air flow conduit, in a seat that includes electrical contacts enabling the filter to be detachably connected to a power supply source. Particularly in household applications where the users may not be adequately skilled technically, it is readily possible that, after cleaning or replacement, the filter will be installed back in its seat in a incorrect manner so that electrical connection to the power supply source fails to be restored. Quite obviously, this would considerably impair the performance of the air purifier as a whole.

SUMMARY OF THE INVENTION

It is therefore a main purpose of the present invention to provide an air purifier apparatus equipped with an electrostatic filter, which is adapted to minimize the possibility of the apparatus operating under incorrect conditions.

It is further an object of the present invention to provide an air purifier apparatus of the above cited type, which is capable of operating in a particularly reliable and economical manner with a particularly low energy consumption.

In order to obtain the above and other objects, according to the present invention, an air purifier apparatus is provided with an alarm device having two indicator states indicative of whether the electrostatic filter is properly mounted within the air purifier apparatus. In particular, in a preferred embodiment of the invention, an electrical contact is provided which becomes electrically connected to a power supply through the electrostatic filter when the electrostatic filter is properly mounted within the air purifier apparatus. In such a state, the alarm device is energized by the power supply through the electrostatic filter and the electrical contact to provide an indication that the electrostatic filter is properly mounted within the air purifier apparatus. The alarm device may be formed of a elastically deformable or pivotable metal blade which functions as a shutter in response to a electrostatic force.

BRIEF DESCRIPTION OF THE DRAWINGS

The characteristics and the advantages of the present invention will be better understood from the following description which is given by way of non-limiting example with reference to the accompanying drawings in which.

DETAILED DESCRIPTION OF THE PREFERRED EMBODIMENT

Figure 1:
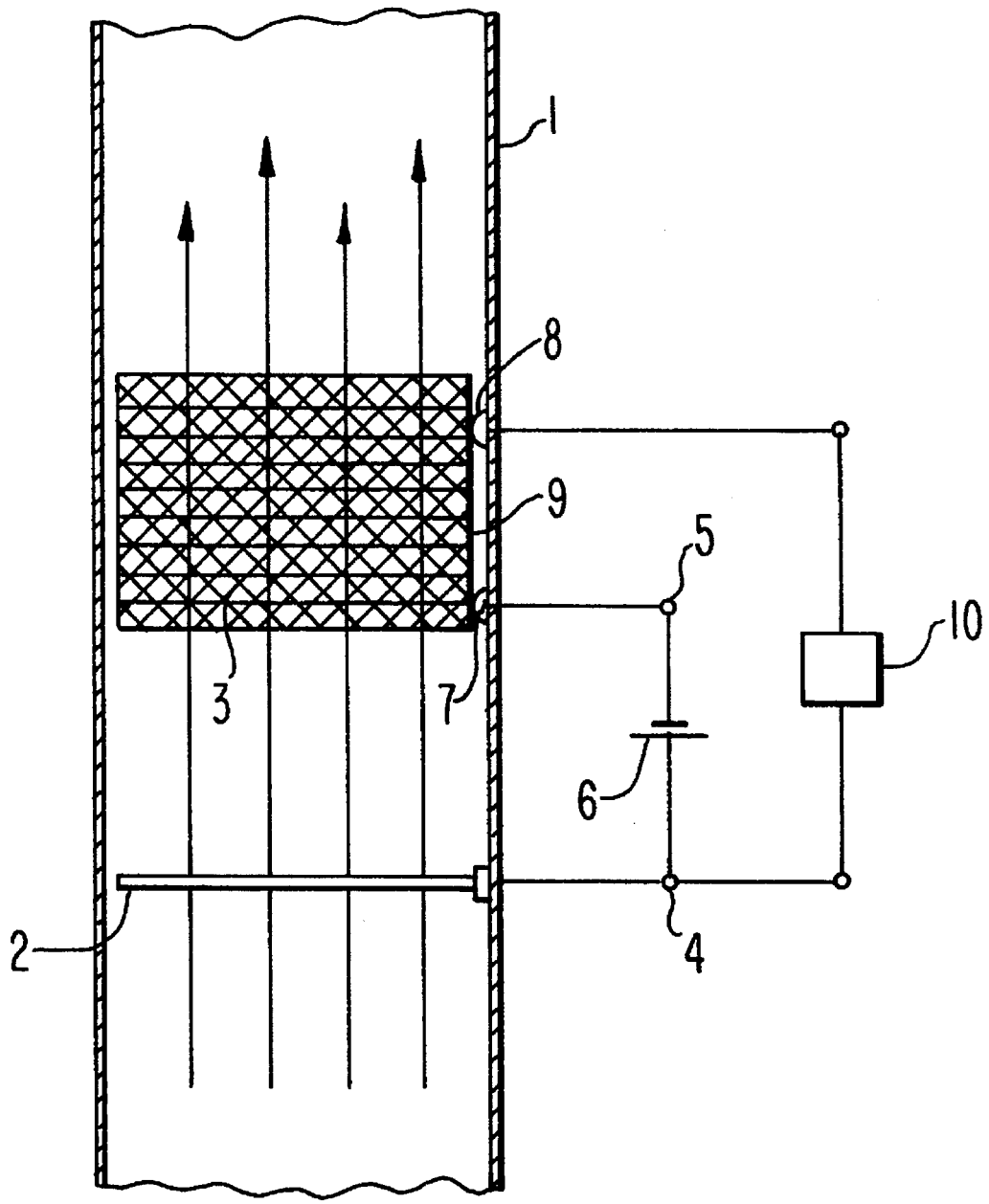
FIG. 1 is a schematic view of an air purifier apparatus according to the present invention.

Referring now to FIG. 1, it can be seen that the air purifier apparatus includes a conduit 1 of an insulating material, in which an air flow is capable of circulating in the direction shown by the arrows, either by natural or forced convection. In an essentially per se known manner, in the conduit 1 there are located a first electrode 2 and at least an electrostatic filter 3, which are arranged in succession with respect to the direction of the flow of air and are capable of respectively ionizing and attracting, and retaining, dirt particles that are suspended in the air stream passing therethrough.

The electrode 2, which may for instance be constituted by a metal rod, is connected to the terminal 4 of a high-voltage DC power supply source, which is generally indicated by reference numeral 6 in FIG. 1 and which is associated with a per se known type of main on-off switch (not shown).

The filter 3 acts as a second electrode and, to this end, it may be made of a slightly conductive cardboard material or may be made of a metal mesh or the like. In particular, the filter 3 is connected to the opposite terminal 5 of the high-voltage DC power supply source 6 through at least an electrical contact 7. The contact 7 is mounted inside the conduit 1 at a position corresponding to a seat (not shown) adapted to accommodate the filter 3, in a removable manner, and is electrically connected to the terminal 5 of the power supply source 6.

In a position adjacent to the contact 7 there is provided at least a further electrical contact 8. The two contacts 7 and 8 are electrically interconnected through the filter 3 when the filter 3 is located correctly in its operational position. To this end, the filter 3 may be provided with an area 9, or the like, which is made of a highly conductive material (for instance, copper) which is capable of creating a short-circuit bridge between the contacts 7 and 8 when the filter 3 is in its correct operational position.

Between the contact 8 and the electrode 2 there is connected an alarm indicating device 10 which, as it will be explained in more detail below, is adapted to be driven by the power supply source 6 so as to indicate a possible malfunctioning of the electrostatic filter, such as the filter 3 not being connected to the power supply 6 in the correct manner.

According to a feature of the present invention, the alarm device 10 is energized by the power supply source 6 through the filter 3, which, has already been illustrated above, is adapted to short-circuit the electrical contacts 7 and 8. Therefore, the alarm device 10 is energized only when the electrostatic filter is regularly energized, so that it can indicate a regular operating condition. In the opposite case, the alarm device 10 remains de-energized and in this manner indicates an alarm condition. Accordingly, after a cleaning or replacement of the filter 3, in the event that the filter 3 is mounted back in the seat in an improper manner which does not enable it to be energized by the power supply source 6, an indication of this malfunction condition is provided to the user.

Figure 2:
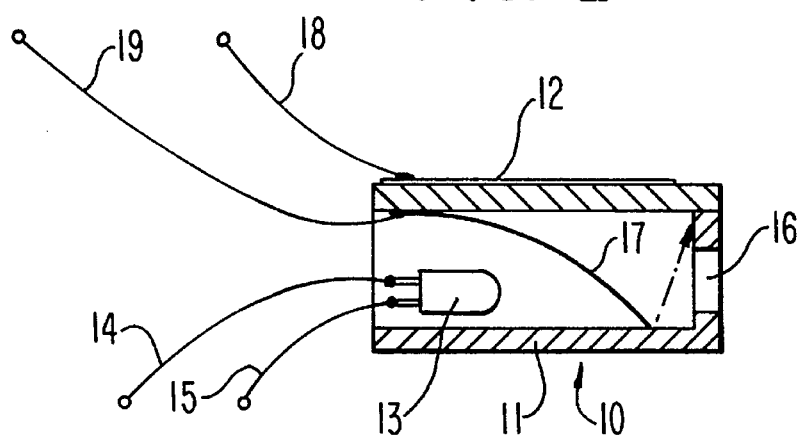
FIG. 2 is a view illustrating a preferred embodiment of a component part of the air purifier apparatus shown in FIG. 1.

The alarm indicating device 10 may for instance include an acoustic or optical indicator. However, in a preferred manner, the configuration of FIG. 2 is employed for advantageously minimizing power input and energy usage. Such an alarm indicator 10 mainly includes a hollow casing 11 of insulating material. On the outer surface of the casing 11 (preferably on the upper portion) there is attached a metal blade 12 (for instance, of copper), whereas inside the casing 11 there is housed a LED 13 or a similar display device, whose terminals 14, 15 are connected directly to the terminals of a common low-voltage power supply source (not shown).

When the air purifier is switched on, the LED 13 is normally energized, but is visible through a window 16 provided on the casing 11 only if a normally closed shutter 17 is actuated into its open position. More precisely, the shutter 17 is formed by a thin, flexible metal blade, for instance of aluminum, possessing a shape-memory ability (elasticity) such as to normally maintain the bent condition shown in FIG. 2. Through respective conductors 18, 19, the metal blades 12 and 17 are respectively connected to the terminal 4 of the power supply source 6 and the electrical contact 8, or vice-versa. As a consequence, when the filter 3 is correctly positioned in contact with the electrical contacts 7, 8, the voltage from the power supply source 6 will be also applied between the metal blades 12 and 17, between which an electrostatic field is therefore generated. The electrostatic field attracts the flexible blade 17 into a position adjacent to the stationary blade 12 (as shown by the arrow in FIG. 2). The shutter 17 is thus opened, thereby enabling the LED 13 to indicate through the window 16 that the prevailing operating condition of the air purifier is correct.

As should be apparent, the alarm indicating device 10 is advantageously simple in its construction, inexpensive, reliable and does not require any substantial power input to its component parts. In particular, minimal electric current is delivered to it by the high-voltage power supply source 6, and no such current is supplied when the window 16 is closed indicating a non-operative state.

Figure 3:
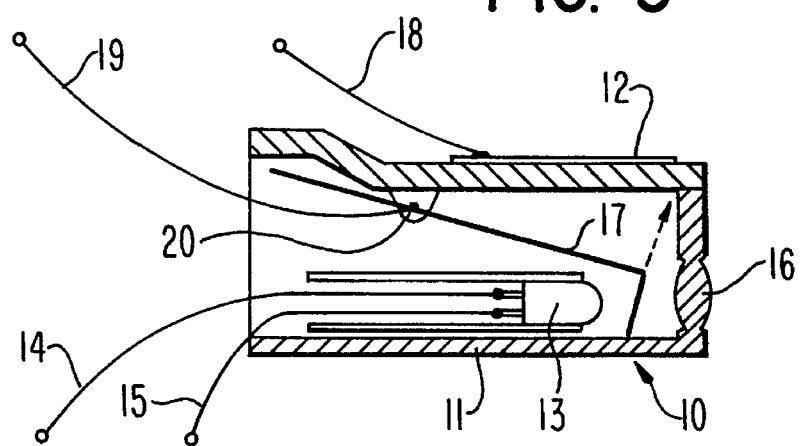
FIGS. 3 and 4 are views illustrating respective variants of the component part shown in FIG. 2.

In the variant shown in FIG. 3, the shutter 17 is of the position-memory type. The shutter is made in the form of a lever which is hinged in a slightly out-of-balance manner at its fulcrum 20, so that it is able to normally conceal the display 13 by the effect of gravity. A slight electrostatic attraction force is required to displace the shutter 17 towards the blade 12 when the alarm indicator 10 is connected to the power supply source 6. In order to facilitate the movement of the shutter 17, the casing 11 may be configured as shown in FIG. 3, and the conductor 19 may be connected to the shutter 17 at the fulcrum 20.

Figure 4:
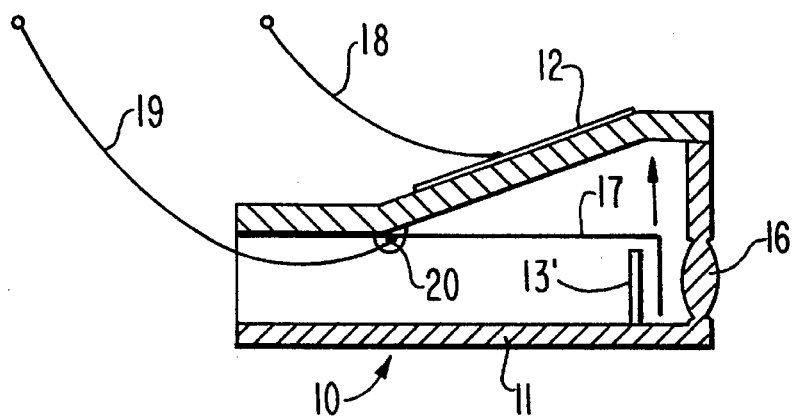

In the variant illustrated in FIG. 4, the display 13' is simply provided in the form of a colored band or the like, which is visible through a window 16 that preferably includes a magnifying lens. The operation of this alarm indicating device 10 is similar to that of the variant appearing in FIG. 3, except that the indicator itself does not require any power supply source for its display 13'.

It will be appreciated that the air purifier apparatus as it has been described here may be the subject of a number of further modifications, without departing from the scope of the present invention as defined by the appended claims.

What is claimed is:

1. An air purifier apparatus comprising:

a power supply;

a first electrode connected to a first terminal of said power supply;

an electrical contact connected to a second terminal of said power supply;

an electrostatic filter detachably and operatively connected to said electrical contact;

an alarm device having at least first and second indicator states, said alarm device having said first indicator state when said electrostatic filter is electrically connected to said power supply through said electrical contact, and said alarm device having said second indicator state when said electrostatic filter is not electrically connected to said power supply through said electrical contact; and a second electrical contact which is connected to said alarm device, wherein said electrostatic filter is detachably and operatively connectable to said second electrical contact, and wherein said electrical contact and said second electrical contact are electrically connected through said electrostatic filter when said electrostatic filter is operatively connected to said electrical contact and said second electrical contact;

wherein said alarm device includes means for changing from said second indicator state to said first indicator state when energized by said power supply through said electrostatic filter and said second electrical contact;

wherein said alarm device includes a display indicator and an electrostatically controlled shutter, said electrostatically controlled shutter concealing said display indicator in the absence of energy from said power supply and revealing said display indicator when energized by said power supply.

2. An air purifier apparatus as claimed in claim 1, wherein said electrostatically controlled shutter includes first and second metal blades respectively connected to said second electrical contact and said power supply, wherein one of said first and second metal blades is displaced towards the other of said first and second metal blades in response to an electrostatic force between said first and second metal blades when energized by said power supply.

3. An air purifier apparatus as claimed in claim 2, wherein said one of said first and second metal blades is elastically deformed in response to said electrostatic force.

4. An air purifier apparatus as claimed in claim 2, wherein said one of said first and second metal blades moves about a pivot in response to said electrostatic force.

* * * * *